United States Patent Office 2,846,328
Patented Aug. 5, 1958

2,846,328
NON-DUSTING MODIFIED ROSIN DRY SIZE

Edward Strazdins, Stamford, Conn., assignor to American Cyanamid Company, New York, N. Y., a corporation of Maine No Drawing. Application August 4, 1955
Serial No. 526,575

7 Claims. (Cl. 106—218)

The present invention relates to dry rosin size powder of decreased tendency to dust. More particularly, the present invention relates to dry rosin size powder substantially composed of dry modified rosin size powder, the powder particles being coated with a small but effective amount of a non-volatile hydrocarbon oil as anti-dusting agent.

Dry rosin size has long been manufactured in large tonnages and used as a "beater" additive size to render the paper resistant to penetration by ink and water, the size being precipitated on the fibers by addition of alum. The size corresponds to the product formed by cooking or "saponifying" rosin with a chemically equivalent amount of sodium hydroxide or carbonate thereby forming a strong soap solution, and recovering the soap in dry form as sodium rosinate. The latter step is performed commercially either by spray-drying or drum-drying the soap solution (cf. U. S. Patents Nos. 2,134,912 and 2,265,941). In the latter event thin flakes of sodium rosinate are obtained.

The flakes obtained by drum-drying are friable and pulverize during the handling incident to bagging and shipping the flakes. The powders ultimately resulting from either drying method conform to a rather broad particle size distribution curve, so that while a substantial part of the powder is in the form of particles so large as to be easily visible by the naked eye a not inconsiderable proportion is a dust composed of particles finer than 325 mesh.

The size is customarily shipped to the paper manufacturer in paper bags of the multilayer type which are stored in the mill until needed. The bags are then ripped open and the contents dumped into a suitable location in the papermaking system, generally the beater.

The unbagging-dumping operation referred to raises a large volume of dust, roughly equivalent to the dumping of an equal weight of talcum powder. Moreover, rosin size is the salt of a strong base with a weak acid. The dust is therefore highly alkaline and irritating to the mucus membranes of the eyes, nose and throat so much so that all workers in the vicinity of the unbagging operation must be equipped with respirators or air filter masks and goggles. Moreover, the dust tends to deposit on the skin and on the hair, ears, etc., of the workers, tending to cause dermatitis, and this discomfort is aggravated during the summer when the workers perspire. Furthermore, the dust settles over the general work area, and on humid days or when water is otherwise present an extremely slippery and hazardous footing results, the dust transforming itself into a soapy grease.

As a resulting a demand exists for a dry rosin size which can be shipped in bags, stored for substantial periods of time, and unbagged and dumped in the manner described without the raising of more than a negligible or tolerable amount of dust.

U. S. Patent No. 2,358,683 granted on September 19, 1944, to McLagan et al., discloses that the fine powder obtained by spray drying certain synthetic resins can be rendered non-dusting by coating the particles of the powder with an oil or an oily liquid having an oily character. The disclosure of this patent was applied to the treatment of dry rosin size in powdered form referred to above, and an immediate and complete anti-dusting effect was achieved.

Surprisingly, however, this anti-dusting effect proved fugitive. The effect very largely diminished within a few weeks and substantially completely disappeared when the size was stored at room temperature, the oil apparently slowly dissolving in the size during storage and thus ceasing to act as an anti-dusting coating on the surface of the particles.

As a result, the disclosure of the patent was of no practical value, as several months often elapse between the time the size is manufactured and the time when the size is unbagged for use in the manufacture of paper.

The discovery has now been made that a dry rosin size of prolonged non-dusting properties can be prepared by first reacting one mol of rosin with at least about $\frac{1}{12}$ mol of an $\alpha,\beta$-unsaturated organic compound of acidic character containing a —CO—C=C— group so as to form a Diels-Alder condensate therewith, then forming this reaction product into a dry size, and finally coating the particles of the dry size thus obtained with small but effective amount of a non-volatile hydrocarbon oil as anti-dusting agent.

The invention is specific in two of its principal aspects. First, for commercially worthwhile results the dry size must contain at least $\frac{1}{12}$ mol of the $\alpha,\beta$-unsaturated organic material per mol of rosin initially taken. Secondly, the oil added must be an alkane hydrocarbon oil and preferably is a petroleum hydrocarbon oil. All other oils tested including vegetable oil, ester oil, oily alcohol, oily acid, and oily glyceride impart at best only fugitive anti-dusting properties rendering the product unsatisfactory.

The reason why alkane hydrocarbon oils are specifics for rendering modified rosin size non-dusting over extended periods of time is not known and I do not wish to be bound by any theory. The result may be conveniently explained on the assumption that the combined saponified $\alpha,\beta$-unsaturated acidic material renders the size very insoluble towards hydrocarbon oil so that the oil tends to remain on the surface of each particle, where alone it exercises anti-dusting action.

The dry sizes of the present invention may be a complex mixture of sodium rosinate, the sodium salts of the Diels-Alder reaction products referred to, and the impurities present in commercial rosins. The sizes are thus most conveniently defined in terms of their method of preparation, i. e., as dry rosin size particles coated with a small but effective amount of a non-volatile hydrocarbon oil as anti-dusting agent, the rosin from which the size is prepared corresponding to that formed by reacting rosin with an $\alpha,\beta$-unsaturated organic compound of acidic character containing a —CO—C=C— group to form a Diels-Alder condensate. The effect of the combined unsaturated organic material is to prolong the anti-dusting effect of the oil.

The present invention is applicable to dry sizes prepared from any of the commercial rosins including gum rosin, wood rosin, tall oil rosin, the commercially available stabilized heat-treated tall oil rosins containing anti-oxidant material, including disproportionated tall oil rosin, and mixtures of the foregoing.

The organic compounds of acidic character containing the —CO—C=C— linkage referred to above are water-soluble acids or the anhydrides prepared therefrom. They include the lower $\alpha,\beta$-unsaturated acids and anhydrides such as maleic anhydride, maleic acid, acrylic acid, fumaric acid, citraconic acid, itaconic acid, the mixtures of acid or acid anhydrides formed by dehydrating citric acid at elevated temperature and mixtures thereof.

Neither the particular rosin nor unsaturated acid is a primary feature of the present invention.

The amount of combined unsaturated acid in the size may be varied over a wide range. The minimum commercially useful amount is about 1/12 mol per mol of the free rosin equivalent of the size (i. e. per mol of rosin initially taken). The amount of unsaturated acid may be and preferably will be considerably more. Best results are usually obtained (consonant with maximum water-repellence imparted by the size) when about 1/10–1/5 mol of the acid is present. It is possible for the size to contain up to one mol of the $\alpha,\beta$-unsaturated acid, the larger amounts of acidic material prolonging the anti-dusting properties imparted by the hydrocarbon oil while however somewhat decreasing the efficiency of the size as agent imparting water-resistance to paper. The evidence indicates that any non-volatile hydrocarbon oil may be used, and surprisingly crude hydrocarbon oils have yielded about the same results as the most refined. Because of the excellent results obtained coupled with their ready availablity I prefer petroleum oils and particularly refined oils which do not affect the color of the size.

The oil may be blended with the size in any convenient way such as for example by spraying the oil as a mist, but it is essential that the oil be applied not before the size leaves the drum drier or spray drier. The addition of the oil to the rosin either before the rosin is reacted with the $\alpha,\beta$-unsaturated acid or before the Diels-Alder condensation product thus obtained is saponified, is without substantial anti-dusting effect.

It is often more convenient to form a master batch of the size containing a large amount of the oil, and proportion the master batch into a stream of untreated size so as to yield a blended product containing the oil in desired concentration. The streams are tumbled together, and the oil appears to cover all the particles instantly. The invention includes the addition of the oil in the form of an aqueous emulsion.

The amount of hydrocarbon oil added need be no more than that required to cause the anti-dusting effect desired. Distinct dust suppression occurs when the amount of oil added to 0.1% of the weight of the size and this amount is accordingly regarded as about the minimum which is commercially useful. At the other extreme, 1% of the oil yields complete dust suppression which persists for extremely long periods of time and this amount is therefore the upper practical limit, no more being generally needed. Within this range the optimum amount depends on such independent variables as the length of time it is anticipated that the rosin size will be stored, the amount of combined $\alpha,\beta$-unsaturated acid in the rosin, and the particular hydrocarbon oil employed. In the case of sizes containing 1/10–1/5 mol of combined maleic anhydride based on the free rosin equivalent of the size we have found it unnecessary to add more than 1/4% to 1/2% of oil based on the weight of the rosin. This amount of oil gives very satisfactory dust suppression for about three months, which is satisfactory in the case of most size placed on the market in the United States today.

The invention will be more particularly illustrated with reference to the examples. These examples constitute specific embodiments of the invention and are not to be construed in limitation thereof.

*Example 1*

A typical maleated rosin size suitable as raw material for the present invention was prepared as follows.

7.25 lbs. of gum rosin was melted at 155° C. and to this over one hour was added 1.2 lbs. of maleic anhydride. A Diels-Alder reaction took place which caused the temperature to rise to 200° C., which temperature was maintained for three hours to insure completion of the reaction. To the product was added 21.33 lbs. of molten disproportionated tall oil rosin containing 0.75% by weight of phenothiazine as antioxidant. The mixture was stirred until homogeneous, cooled to just above its flow point, and slowly run into 14.0 lbs. of well-stirred water at 80° C. containing 5.5 lbs of soda ash. The rosin was cooked with continued agitation for four hours at 85° C.–95° C. A liquid size resulted which contained about 1/8 mol of combined maleic anhydride based on the free equivalent of the size, i. e., on the mols of rosin (gum and tall oil) initially taken.

The liquid size was dried on a steam-heated laboratory drum drier provided with a doctor blade. Thin friable flakes were obtained which were bagged in transparent plastic film and the bag tumbled until powder was obtained which resembled commercial dry rosin size after bagging and shipping.

*Example 2*

The following illustrates the conversion of the powdery size of Example 1 into non-dusting form in comparison with ordinary (i. e. non-maleated) rosin size, together with the effect of varying the amount of hydrocarbon oil added. The hydrocarbon oil used was "DTE oil" (a water-white refined hydrocarbon oil having about the viscosity of ethylene glycol). The oil was a mixture of petroleum alkanes.

Test samples were prepared by taking three 20-gm. portions of the size of Example 1, stirring 0.1-gm. of the hydrocarbon oil into the first sample, 0.3-gm. of the hydrocarbon oil into the second sample, and 1.0-gm. of the hydrocarbon oil into the third, and blending each of the samples with a fresh 80-gm. portion of the size, experience having shown that by this method the most uniform blend is obtained.

For purposes of comparison a similar set of samples was prepared using a commercial dry rosin size (known as "Accobrite" dry size), this size being a rosin size prepared by direct saponification of rosin and thus containing no combined maleic anhydride.

Sufficient of each sample of size thus prepared was placed in a straight-walled glass jar 3" in diameter and 6" high provided with a screwcap closure so as to form a bed about 2" deep. Control bottles were prepared containing the sizes to which no oil had been added.

The sizes were tested as follows. First each bottle was given a quick shake with the cap in place and the amount of dust liberated determined by viewing the bottle through transmitted light. Any dust raised was allowed to settle. Then each bottle was given a quick shake under direct illumination and immediately opened against a black screen. The sizes which dusted evolved a "smoke" of dust which was clearly visible against the black screen, the "smoke" (in the case of ordinary untreated rosin dry size) arising in much the same manner as fumes arise from an opened bottle of fuming sulfuric acid. The results were averaged and the samples rated according to arbitrary scale wherein a rating of 10 designates a sample developing dust to about the same extent as ordinary (un-oiled) dry rosin size, a rating of 0 designates a well-oiled sample of size (which develops no dust at all), and intermediate ratings designate samples of intermediate dustiness. A value of 3 or less is commercially acceptable.

All of the foregoing samples were capped, stored at room temperature and retested in the manner described at the end of three months.

Results are as follows:

| Sample No. | Size | Oil | | Dusting [2] | |
|---|---|---|---|---|---|
| | | Name | Percent [1] | Initial | After 3 Mos. |
| 1 | Maleated | Nil | | 10 | 10 |
| 2 | do | DTE [3] | 0.1 | 1 | 3 |
| 3 | do | DTE | 0.3 | 0 | 1 |
| 4 | do | DTE | 1.0 | 0 | 0 |
| 5 | Ordinary | Nil | | 10 | 10 |
| 6 | do | DTE | 0.1 | 1 | 10 |
| 7 | do | DTE | 0.3 | 0 | 9 |
| 8 | do | DTE | 1.0 | 0 | 4 |

[1] Based on weight of size.
[2] For definition of values see text above.
[3] For definition see text above.

The results show that the minimum effective amount of oil (0.1%) gave satisfactory anti-dusting properties to the size of Example 1 for three months, whereas in the case of ordinary size the effect of this amount of oil was entirely fugitive. With the preferred amount of 0.3% of oil, dusting was negligibly slight in the case of the size of Example 1 whereas it was bad in the case of the ordinary rosin size sample. With the maximum preferred amount of 1% of oil the size of Example 1 remained completely dust proof for three months whereas the ordinary rosin size gave dust beyond the satisfactory value at the end of that time.

*Example 3*

The effectiveness of a number of different chemical types of oil is illustrated by the following.

Test samples were prepared and tested according to the method of Example 2, the size used being the size of Example 1 containing ⅛ mol of combined maleic anhydride in saponified form, and the oils being as shown in the table below. Results were as follows.

| Oil | | Dusting [2] | |
|---|---|---|---|
| Name | Percent Added [1] | Initial | 3 Mos. |
| Hydrocarbons: | | | |
| SAE 5 W auto lube oil | 0.3 | 0 | 2 |
| SAE 30 W auto lube oil | 0.3 | 0 | 2 |
| Refined paraffin oil (high M. W.) (Fractol A) | 0.3 | 0 | 2 |
| Diesel oil | 0.3 | 0 | 2 |
| Furnace oil (domestic) | 0.3 | 0 | 2 |
| Nujol | 0.3 | 0 | 2 |
| Non-hydrocarbons: | | | |
| Dibutyl phthalate | 0.3 | 7 | 10 |
| Butyl stearate | 0.3 | 6 | 10 |
| Pine oil [3] | 0.3 | 1 | 8 |
| Peanut oil [4] | 0.3 | 7 | 10 |
| Distilled tall oil [5] | 0.3 | 7 | 10 |
| Ethylene glycol | 0.3 | 10 | 10 |
| Polyethylene glycol | 0.3 | 10 | 10 |

[1] Based on the weight of the size.
[2] For ratings see Example 2.
[3] An alcohol.
[4] A glyceride.
[5] An acid.

These results show that in every case the hydrocarbon oils yielded very satisfactory prolonged anti-dusting effect whereas the non-hydrocarbon oils proved to be either of no initial value or of only fugitive effectiveness.

I claim:

1. A process for the manufacture of dry rosin size of prolonged non-dusting properties which comprises first heating one mol of rosin with at least about $\frac{1}{12}$ mol of an $\alpha,\beta$-unsaturated organic compound of acidic character containing a —CO—C=C— group to form a Diels-Alder condensate therewith, then forming the reaction product into a dry size in particulate form, and finally coating the particles of said size with a small but effective amount of a non-volatile alkane hydrocarbon oil as anti-dusting agent.

2. A process according to claim 1 wherein the particles are coated by spraying the size with the hydrocarbon oil.

3. A process according to claim 2 wherein the hydrocarbon is in aqueous emulsion form.

4. As a composition of matter, dry rosin size particles coated with a small but effective amount of a non-volatile alkane hydrocarbon oil as anti-dusting agent, the rosin in said rosin size corresponding to that formed by reacting one mol of rosin with at least about $\frac{1}{12}$ mol of an $\alpha,\beta$-unsaturated organic compound of acidic character containing a —CO—C=C— group to form a Diels-Alder condensate therewith whereby the anti-dusting effect of said oil is prolonged.

5. A composition according to claim 4 wherein the weight of the oil is about ¼%–½% of the weight of the particles.

6. A composition according to claim 4 wherein the oil is a refined petroleum hydrocarbon oil.

7. Dry rosin size particles according to claim 4, wherein the unsaturated organic compound of acidic character is maleic anhydride.

References Cited in the file of this patent

UNITED STATES PATENTS

| 2,383,933 | Bump | Sept. 4, 1945 |
| 2,386,033 | Chappell | Oct. 2, 1945 |
| 2,423,449 | Heald et al. | July 8, 1947 |
| 2,606,842 | Price | Aug. 12, 1952 |
| 2,628,918 | Wilson | Feb. 17, 1953 |

OTHER REFERENCES

Hovey et al.: Jour. Ind. and Eng. Chem. 32, 272–9 (1940).